United States Patent
Koberstein et al.

(10) Patent No.: US 9,616,731 B2
(45) Date of Patent: Apr. 11, 2017

(54) VEHICLE AIR EXTRACTION SYSTEM AND METHOD

(71) Applicant: Ford Global Technologies, LLC, Dearborn, MI (US)

(72) Inventors: Manfred Koberstein, Troy, MI (US); Paul Bryan Hoke, Plymouth, MI (US); Steven David Errick, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 834 days.

(21) Appl. No.: 13/921,654

(22) Filed: Jun. 19, 2013

(65) Prior Publication Data
US 2014/0378042 A1 Dec. 25, 2014

(51) Int. Cl.
B60H 1/24 (2006.01)

(52) U.S. Cl.
CPC ................... B60H 1/249 (2013.01)

(58) Field of Classification Search
CPC ..... B60H 1/249; B60H 1/00885; B60H 1/248
USPC ................... 454/70, 115, 116, 117, 163, 164
See application file for complete search history.

(56) References Cited

U.S. PATENT DOCUMENTS

| | | | |
|---|---|---|---|
| 3,286,617 A * | 11/1966 | Shirk | B60H 1/248 296/208 |
| 4,144,803 A * | 3/1979 | Gotz | B60H 1/248 454/162 |
| 4,462,303 A * | 7/1984 | Gebhard | B60H 1/248 454/134 |
| 4,804,140 A * | 2/1989 | Cantrell | B60H 1/00428 136/291 |
| 5,040,455 A * | 8/1991 | Doi | B60H 1/00428 454/162 |
| 5,137,490 A * | 8/1992 | Ishikawa | B61D 27/00 454/105 |
| 5,205,781 A * | 4/1993 | Kanno | B60H 1/00428 454/141 |
| 5,413,528 A * | 5/1995 | Pabst | B60H 1/247 454/141 |
| 5,647,793 A * | 7/1997 | Mariaux | B60H 1/00371 454/103 |
| 5,716,269 A * | 2/1998 | Garbooshian | B60H 1/00414 454/139 |

(Continued)

FOREIGN PATENT DOCUMENTS

| | | | | |
|---|---|---|---|---|
| GB | 2453340 A | * | 4/2009 | ............. B60H 1/249 |
| TW | GB 2293002 A | * | 3/1996 | ............. B60H 1/248 |

*Primary Examiner* — Alissa Tompkins
*Assistant Examiner* — Frances F Hamilton
(74) *Attorney, Agent, or Firm* — Vichit Chea; Brooks Kushman P.C.

(57) ABSTRACT

An automotive vehicle air extraction system in fluid communication with a cabin of the vehicle is provided. The extraction system may have a housing arrangement and a pair of extractors attached to the housing arrangement. A chamber may be formed between the housing arrangement and pair of extractors. An air pump may be in fluid communication with the chamber. The pair of extractors may be an inner extractor and an outer extractor. A controller may be configured to activate the air pump to supply airflow to the chamber to close the inner extractor and/or prevent inadvertent opening of the inner extractor.

6 Claims, 4 Drawing Sheets

(56) References Cited

U.S. PATENT DOCUMENTS

| | | | |
|---|---|---|---|
| 5,759,097 A | 6/1998 | Bernoville et al. | |
| 5,984,773 A * | 11/1999 | Gervais | B61D 27/0009 454/105 |
| 6,332,330 B1 * | 12/2001 | Loup | B60H 1/00028 165/42 |
| 6,361,429 B1 * | 3/2002 | Pawlak, III | B60H 1/00207 454/139 |
| 6,409,591 B1 * | 6/2002 | Sullivan | G07F 9/06 194/350 |
| 6,782,914 B2 * | 8/2004 | Kami | B60K 15/03006 123/516 |
| 6,805,623 B2 * | 10/2004 | Robison | B60H 1/00478 454/143 |
| 7,399,221 B2 * | 7/2008 | Masumoto | B60H 1/00378 244/118.5 |
| 8,029,343 B2 * | 10/2011 | Major | B60H 1/00278 454/70 |
| 8,096,862 B1 * | 1/2012 | Demster | B01L 1/02 454/187 |
| 2009/0068940 A1 * | 3/2009 | Bloemeling | B60H 1/249 454/162 |
| 2010/0059208 A1 * | 3/2010 | Nakamura | B60K 1/04 165/104.34 |
| 2011/0165830 A1 * | 7/2011 | Smith | B60H 1/00278 454/75 |
| 2012/0071075 A1 * | 3/2012 | Wolf | B60T 5/00 454/162 |
| 2012/0181827 A1 * | 7/2012 | Aoki | B60K 1/04 297/217.3 |
| 2012/0245781 A1 * | 9/2012 | Kanamori | B60K 6/48 701/22 |
| 2013/0072101 A1 * | 3/2013 | Marleau, Jr. | B60H 1/249 454/143 |
| 2013/0180682 A1 * | 7/2013 | Imada | H05K 7/20863 165/41 |
| 2015/0165874 A1 * | 6/2015 | Kawano | B60H 1/249 454/162 |
| 2015/0195960 A1 * | 7/2015 | Seki | B60L 1/003 361/690 |

* cited by examiner

VEHICLE AIR EXTRACTION SYSTEM AND METHOD

TECHNICAL FIELD

This disclosure relates to the extraction of air and gases from automotive vehicle cabins.

BACKGROUND

Automotive vehicles include capabilities to influence airflow within the vehicle to provide occupant comfort. One aspect of these capabilities includes a release of excess air in the vehicle's cabin created when, for example, a door closes or a climate control system is activated. Door closures and climate control systems may increase pressure in the vehicle cabin and as such, an air extraction system releases the excess air through an extractor vent. During this release, however, the extractor vent may reintroduce undesired air and gas into the vehicle due to environment conditions at or around the extractor vent and/or due to a design of the extractor vent itself. The reintroduction of undesired air and gas may occur more often during situations when the vehicle's engine workload increases, such as during towing or wide open throttle.

SUMMARY

A vehicle includes a cabin in fluid communication with an extraction system. The extraction system includes a housing arrangement and a pair of extractors attached to the housing arrangement. A chamber is formed between the housing arrangement and the pair of extractors. An air pump is in fluid communication with the chamber. The pair of extractors includes an inner extractor exposed to an interior of the vehicle and an outer extractor adjacent to an exterior of the vehicle. A controller is configured to activate the air pump to supply airflow to the chamber. The housing arrangement is configured to direct the airflow onto the inner extractor to prevent opening of the inner extractor.

A method for preventing fluid ingress to a cabin of a vehicle includes an air pump which activates to supply airflow to an extractor arrangement in fluid communication with the cabin. The air pump activates in response to an acceleration of the vehicle exceeding a predetermined value. The extractor arrangement has an inner one-way valve and an outer one-way valve. A pressure between the valves increases by receiving the supplied air from the air pump to close the inner one-way valve.

A method for preventing fluid ingress to a cabin of a vehicle includes an air pump which activates to supply airflow to an extractor arrangement in fluid communication with the cabin. The air pump activates in response to a pressure level of the cabin exceeding a predetermined value. The extractor arrangement has an inner one-way valve and an outer one-way valve. A pressure between the valves increases by receiving the supplied air from the air pump to close the inner one-way valve.

A vehicle includes a cabin in fluid communication with a body extractor arrangement. The body extractor arrangement includes a housing and a pair of one-way valves arranged such that a chamber is formed between. An air pump is configured to pressurize the chamber to close one of the one-way valves.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
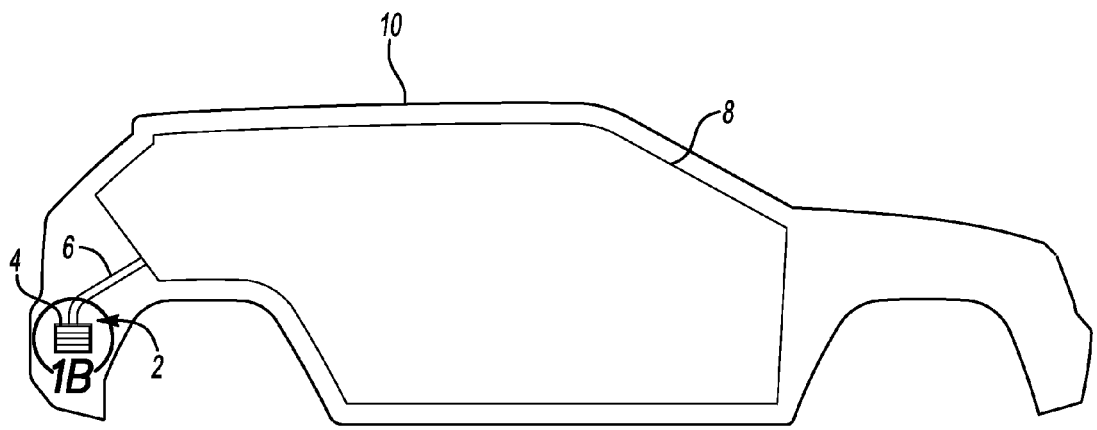
FIG. 1a is a side view, in cross-section, of an air extraction system for a vehicle.
Figure 1B:
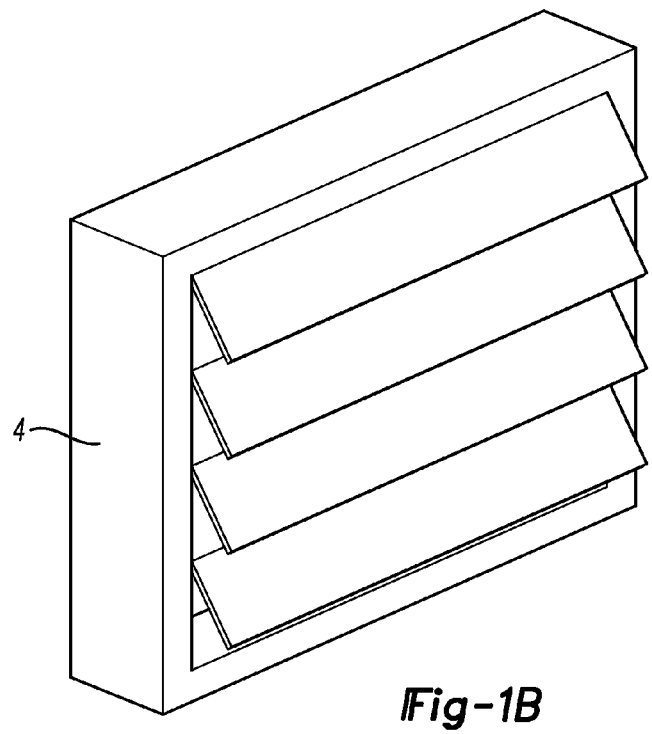
FIG. 1b is a perspective view of an air extractor vent.

Automotive vehicle air extraction may be described as a process where the vehicle releases air and/or gases from the vehicle cabin and/or vehicle interior. The air extraction process typically occurs when a pressure level of the vehicle cabin increases above a normal condition such as when a door closes or a climate control system is activated. FIGS. 1a and 1b show an air extraction system 2 which includes an air extractor vent 4 and an airflow channel 6 as known in the art. The system 2 is in fluid communication with a vehicle cabin 8 on a vehicle 10. The extractor vent 4 is intended to act as a one-way air valve that releases gases from the vehicle cabin 8 and airflow channel 6. However, conditions at or near the extractor vent 4 may cause two-way airflow as described below. Extractor vents are often positioned toward a rear cargo compartment or a rear wheel well and may be referred to as extractors.

In addition to releasing gases, the extractor vent 4 may introduce undesired gases back into to the vehicle airflow channel 6 and vehicle cabin 8. The introduction of undesired gases may increase when excess vehicle exhaust is present. Increased engine workload may generate excess vehicle exhaust which may re-enter the airflow channel 6 via the extractor vent 4. This increased engine workload may arise during wide open throttle for passing or when the vehicle is pulling a trailer or other load. A pressure difference on either side of the extractor vent 4 is one condition that may cause two-way airflow through extractor vent 4.

For example, when the vehicle cabin 8 is at a pressure level greater than an exterior system such as the atmosphere, the extractor vent may 4 open to release excess air stored within the vehicle cabin 8. The extractor vent 4 may then close once pressure in the vehicle cabin 8 is equal to or less than the atmospheric pressure at or near the extractor vent 4. However, a localized negative pressure zone may be created at or near the extractor vent 4 which may pull undesired air into the vehicle cabin 8. Vehicles with an auxiliary HVAC or rear fan unit that cool a battery pack can create the localized negative pressure zone behind a body panel. As another example, low pressure zones may be created behind the vehicle when in forward motion. Poor closing characteristics of the extractor vent 4 may further increase the influx of undesired air when coupled with the pressure differences. One example of an attempt to cure these and other extractor deficiencies includes a utilization of magnetically sealing extractors. However, these magnetically sealing extractors may be more complex and add cost while also decreasing vehicle climate attributes and vehicle door closing attributes. Improvements to air extraction systems in automotive vehicles which limit or eliminate a reintroduction of undesired gases back into the vehicle cabin are desired.

FIGS. 2 through 7 show an illustrative extraction system 100 of a vehicle 101 which may include a body extractor arrangement in fluid communication with a cabin 102 and an air pump 104. The air pump 104 is one example of a pressure generation device which may be used with the extraction system 100. A controller 106 may be in communication with the air pump 104 to direct air pump 104 operations. The body extractor arrangement may include a housing 108 and a pair of extractors attached on either side of the housing 108. The pair of extractors may include an inner extractor 110 and an outer extractor 112 which may be one-way airflow valves which open/close in response to air pressure and/or airflow. The extractors and housing 108 may further define a chamber 114 there between. The housing 108 may include an inlet port 116 to receive a tube 128 which may facilitate a fluid communication between the air pump 104 and chamber 114.

Figure 4:
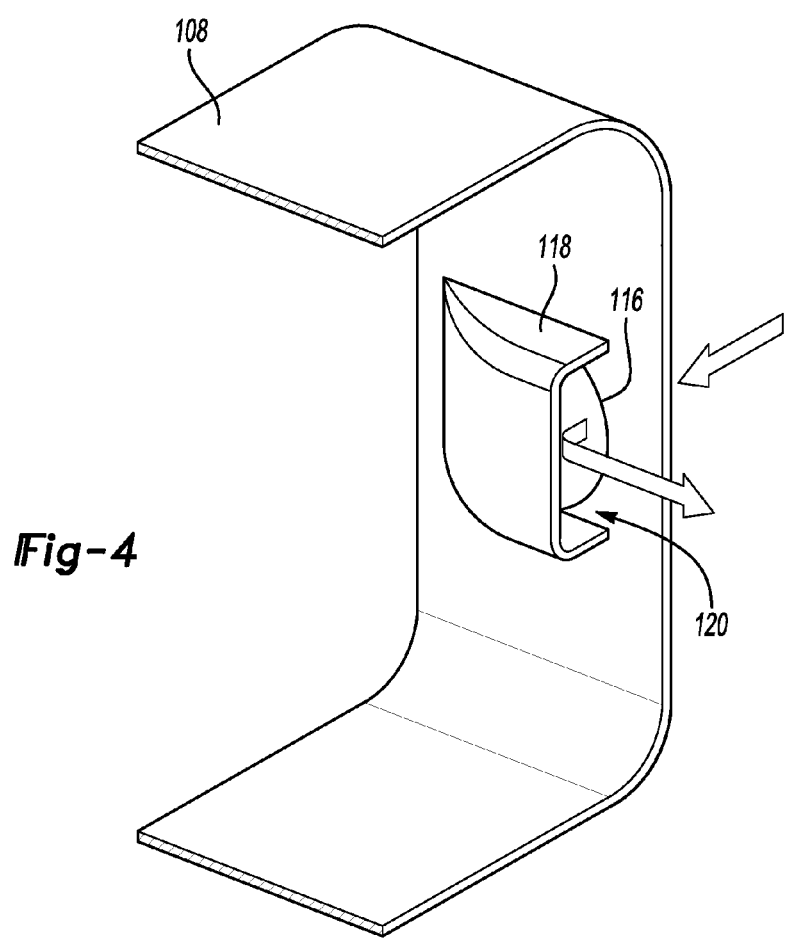
FIG. 4 is a partial rear perspective view of a housing with a baffle for an air extraction system.

For example, the air pump 104 may supply airflow to the chamber 114 to increase pressure and/or to pressurize the chamber 114 to direct closing of the inner extractor 110. Additionally and/or alternatively, the housing 108 may be configured to direct airflow onto the inner extractor 110 to direct the inner extractor 110 to close. For example, FIG. 4 shows an exemplary baffle 118 positioned on the housing 108 and in communication with the inlet port 116. Alternative shapes, contours and/or designs may be utilized for the baffle housing 118 to achieve a desired performance. Air may flow into a baffle cavity 120 via the inlet port 116. The shape of the baffle cavity 120 may then direct the airflow onto the inner extractor 110 to close the same.

Figure 2:
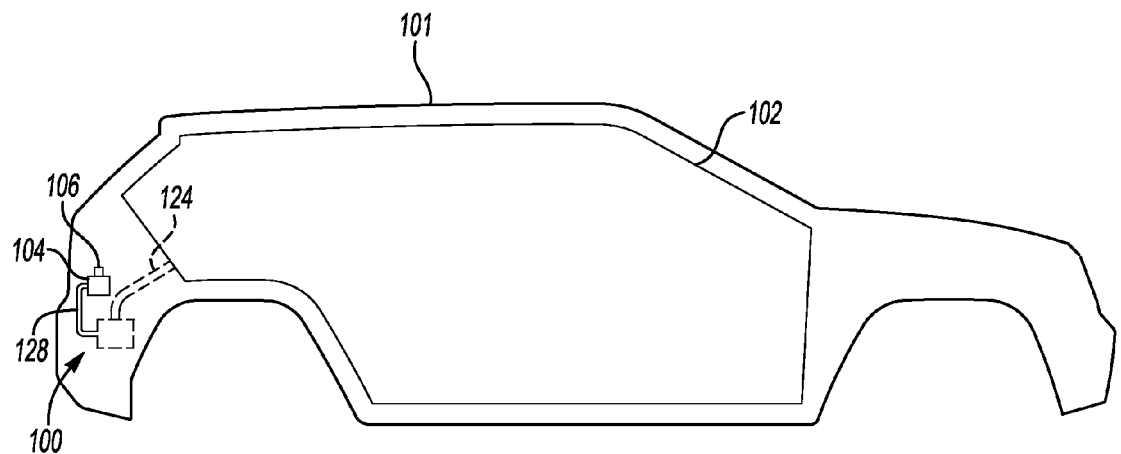
FIG. 2 is a side view, in cross-section, of an air extraction system for a vehicle.

As described above, the extraction system 100 may be positioned to facilitate airflow out of the cabin 102. FIG. 2 shows an exemplary positioning of the extraction system 100 toward a rear portion of the vehicle 101, though other vehicle locations may be utilized. Additional examples of extractor system 100 locations include but are not limited to a vehicle door jam and a vehicle pillar furthest from a vehicle air inlet often positioned just below a front windshield. The extraction system 100 may also include a capability to control airflow from the cabin 102 to the chamber 114 by directing opening/closing of the inner extractor 110.

Figure 3:
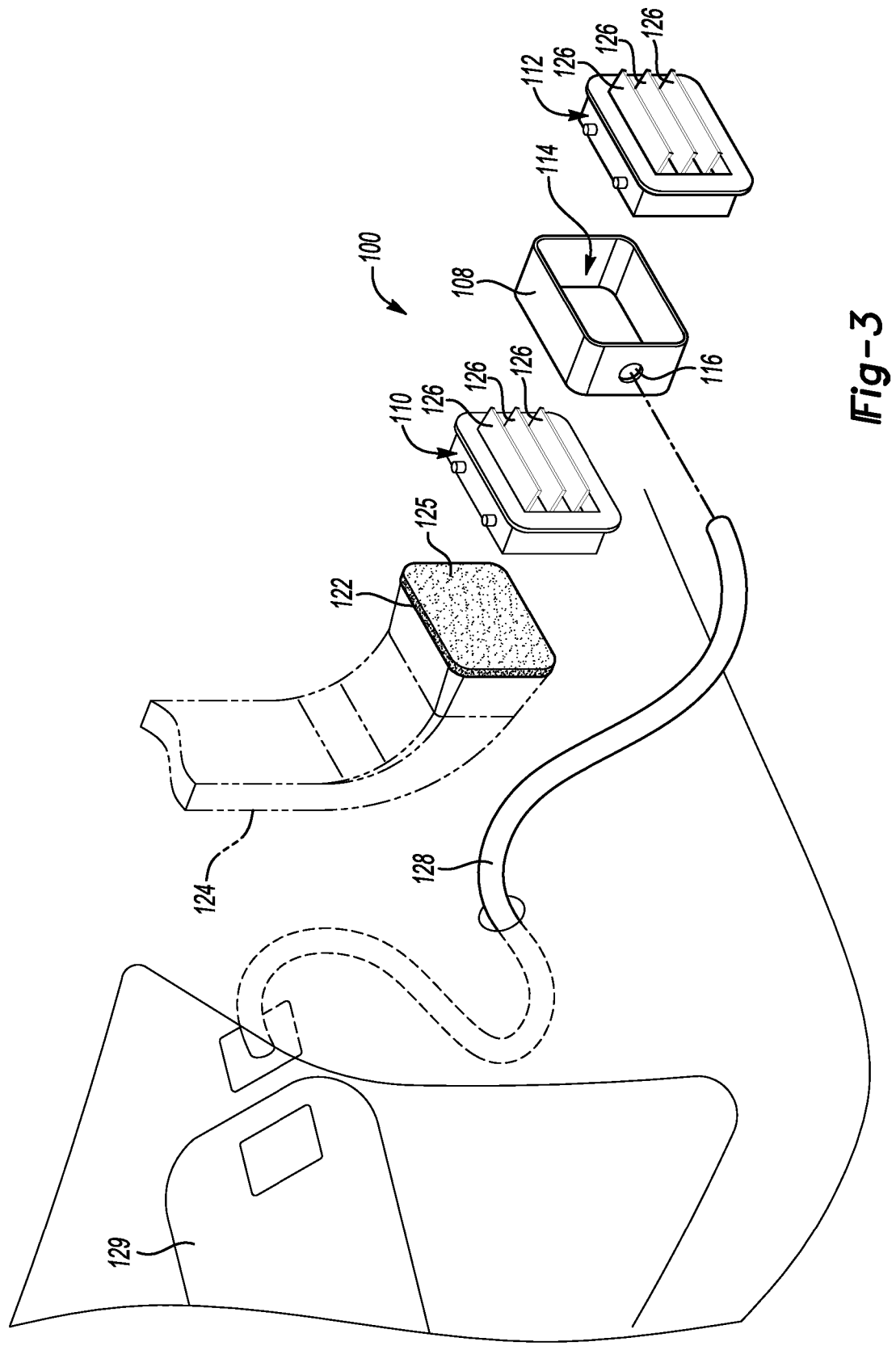
FIG. 3 is an exploded view of an air extraction system for a vehicle.
Figure 5:
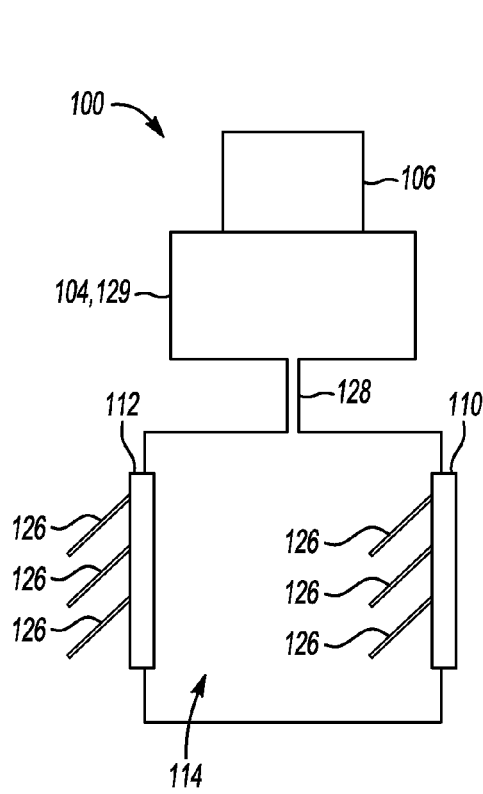
FIG. 5 is a block diagram of an air extraction system for a vehicle.

Referring now to FIGS. 3 and 5, the inner extractor 110 may be in communication with an airflow channel 124 at a vehicle frame opening 125 such that the inner extractor 110 opens away from the airflow channel 124 and toward the chamber 114. A seal, such as a gasket 122, may be positioned at the vehicle frame opening 125 to minimize and/or eliminate air leakage. A variety of airflow channels may be utilized with the extraction system 100. For example and without limitation, an airflow channel may be a tube and/or channel facilitating fluid communication between the cabin 102 and the extraction system 100. In vehicle 101, the airflow channel 124 and cabin 102 may be considered one system with one pressure level. The outer extractor 112 may be in communication with the chamber 114 and open toward the atmosphere and/or exterior system to release gases from the chamber 114. As such, the inner extractor 110 may define an interior of the vehicle 101, and the outer extractor 112 may define an exterior of the vehicle 101. Of course in other examples the outer extractor 112 may not be visible, such as a location behind a vehicle panel. However, the outer extractor 112 may be adjacent to the exterior of the vehicle 101 when not visible. The pair of extractors may include one or more flaps 126 which may be vein-styled flaps as shown in FIGS. 3 and 5. In this illustrative embodiment, vein-style flaps 126 may have structural advantages over a single larger flap due to a higher structural integrity and a reduced potential to be pulled inward and against the desired flow of dispelled gases. The flaps 126 may be of a resilient material such as rubber to improve closure and durability attributes. Varied flap 126 configurations and designs may be used to facilitate desired airflow within the extraction system 100.

As mentioned above, the air pump 104 is an example of a pressure generation device which may supply and control airflow to the chamber 114 and/or adjust pressure in chamber 114. Commands and/or instructions from the controller 106 may direct operation of the air pump 104. The air pump 104 may be positioned at the inlet port 116 and/or may be positioned elsewhere on the vehicle 101. The tube 128 between the inlet port 116 and air pump 104 is an example of a channel that may facilitate airflow transfer to the chamber 114 as shown in FIGS. 3 and 5.

For example, the tube 128 may facilitate airflow from an on-board vehicle auxiliary HVAC system 129 which includes a pressure generation device. The controller 106 may send commands to the HVAC system 129 to activate the pressure generation device. Once activated, the pressure generation device may supply airflow through the tube 128 to the chamber 114. As such, the extraction system 100 is able to utilize a vehicle system already on-board to supply airflow toward the inner extractor 110 and/or to pressurize the chamber 114.

Figure 6:
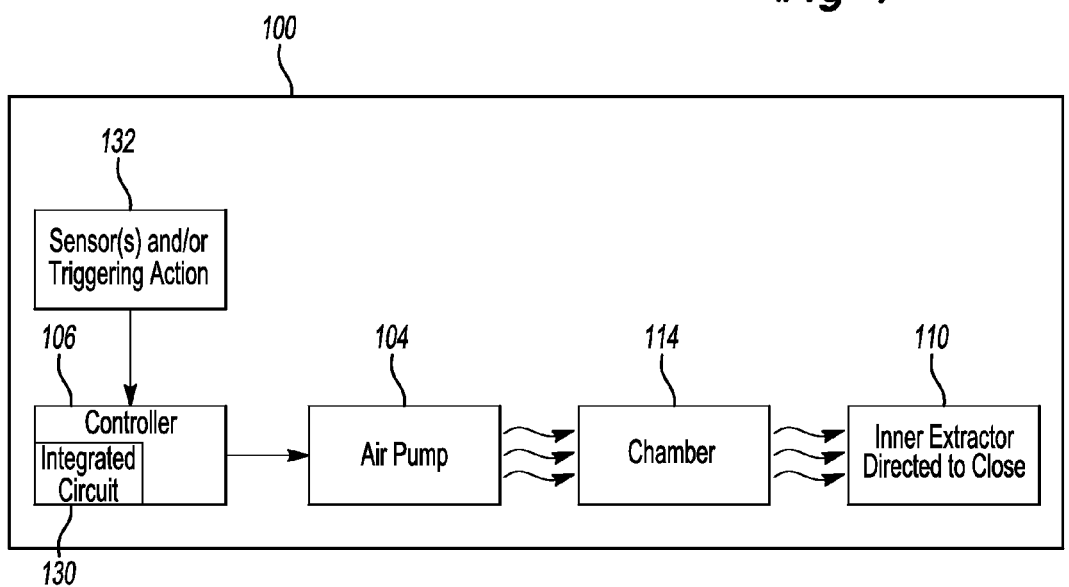
FIG. 6 is a flow chart of an operation scenario for an air extraction system on a vehicle.

Referring now to FIGS. 5 and 6, commands and/or instructions from the controller 106 may direct closing of the inner extractor 110. The controller 106 may be configured to activate the air pump 104 when the controller 106 receives a signal, such as a detection signal, from a sensor 132. The sensor 132 may send the signal when, as an example, the chamber 114 pressure level is at a predetermined threshold. Additionally and/or alternatively, an activation of a recirculation mode or fresh air mode in the HVAC system 129 may trigger sending a signal to the controller 106. (Recirculation modes typically reuse and/or recirculate air within a vehicle cabin instead of pulling in air from outside the vehicle. This recirculation may provide fuel consumption benefits, but also may increase the potential to introduce undesired gases into the vehicle when an exactor inadvertently opens. Fresh air mode typically pulls in air from outside the vehicle and thus increases a pressure level of the cabin.) The signal may indicate activation of the recirculation mode and may be received by an integrated circuit 130 within the controller 106. The integrated circuit 130 may have a processor to direct operations and a memory which may include preprogrammed commands/instructions. Once the signal is received, the integrated circuit 130 may determine a course of action and send a control signal to the air pump 104 to activate and supply airflow to the chamber 114.

For example, the air pump 104 may send the airflow at a predetermined airflow rate and/or at a pulsed output rate. The predetermined airflow rate and/or pulsed output rate may achieve a predetermined pressure level threshold of the chamber 114 to close the inner extractor 110. Additionally and/or alternatively, the chamber 114 may be configured to direct the airflow onto the inner extractor 110 to close the inner extractor 110 with the baffle 118 as described above. As such, the controller 106 may be utilized to optimize the chamber 114 conditions, including but not limited to pressure level and/or airflow, to obtain a desired extraction system 100 performance in which the inner extractor 110 closes to assist in preventing undesired gases from reentering the vehicle cabin 102.

A variety of controllers and/or control systems may be used to direct operation of the extraction system 100. These control systems may include one or more sets of instructions such as, without limitation, real time operational instructions in addition to preprogrammed operation commands/instructions described above. Each of the available controllers and/or control systems may utilize the sensor 132 and/or additional sensors to determine vehicle conditions including but not limited to accelerator pedal position and system pressure levels. A change in theses vehicle conditions may provide triggering actions to activate the extraction system 100. As mentioned above, wide open throttle of an accelerator pedal may create additional exhaust and increase the likelihood of undesired gas reentering a vehicle. Accelerator pedal travel may therefore provide one vehicle condition to monitor to determine whether to activate the air extraction system 100. The controller 106 may be programmed to activate the air pump 104 when the sensor 132 sends a signal indicating a pedal position above a predetermined threshold. Additionally and/or alternatively, the controller 106 may be programmed to command the air pump 104 to pressurize the chamber 114 in response to an acceleration of the vehicle exceeding a predetermined threshold. The sensor 132 may monitor chamber 114 pressure levels and send signals to the integrated circuit 130 to activate the air pump 104 based on pressure readings.

Other vehicle conditions may be monitored to provide information to the controller 106. The integrated circuit 130 may process the information and send control signals to the air pump 104. For example, the control signal may be an 'increase airflow' command in which the air pump 104 increases airflow to the chamber 114. The control signal may be a 'remain in current state' command in which the air pump 104 remains in a current output state. Additionally, the control signal may be a 'reduce airflow' command in which the air pump 104 reduces airflow to the chamber 114. As such, the extraction system 100 includes a controller and/or control system which may monitor vehicle conditions to assist the extraction system 100 to react in real time to vehicle condition changes.

Figure 7:
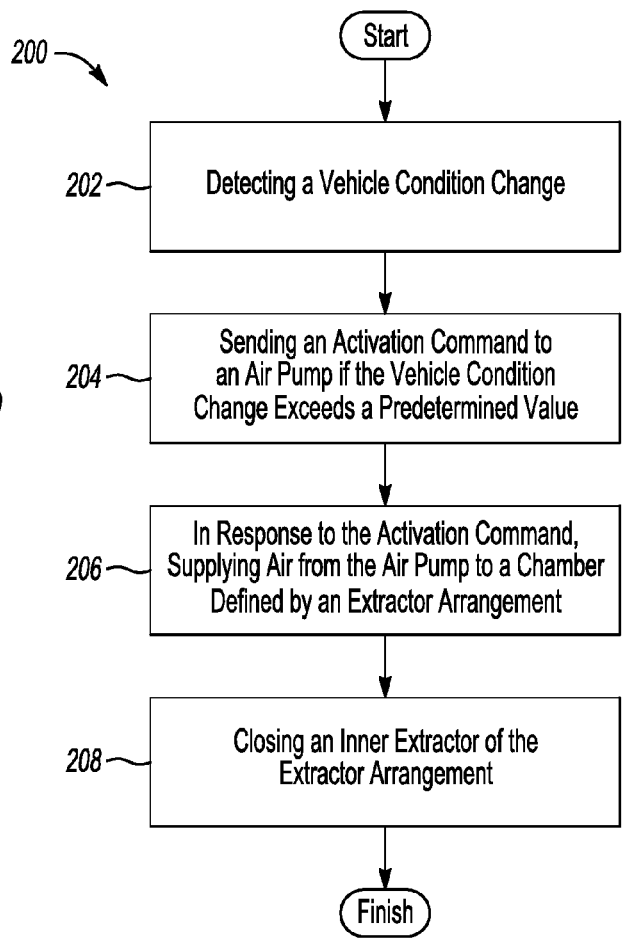
FIG. 7 is a flow chart of a method to assist in preventing inadvertent opening of an air extractor vent on a vehicle.

Now referring to FIG. 7, an algorithm is generally indicated by reference numeral 200. Operation 202 may include detecting a vehicle condition change, such as the accelerator pedal travel, the vehicle acceleration and/or the cabin pressure level. In operation 204, an activation command may be sent to the air pump 104 if the vehicle condition change exceeds the predetermined threshold or value as described above. In response to the activation command, the air pump 104 may supply air to the chamber 114 in operation 206 to close the inner extractor 110 in operation 208.

As one example, the sensor 132 may detect an accelerator pedal position outside the predetermined threshold and/or value. Once the vehicle condition change is detected, the sensor 132 may send a detection signal to the integrated circuit 130. The integrated circuit 130 may then determine a course of action corresponding to the received detection signal. The course of action may be derived from the preprogrammed commands and/or instructions. If the detection signal indicates the accelerator pedal position is above a predetermined threshold, the integrated circuit 130 may determine a course of action to increase airflow. The integrated circuit 130 may then send a control signal to the air pump 104 based on the determined course of action. The signal may include a command to activate the air pump 104. Airflow may be supplied from the air pump 104 to the chamber 114 to close the inner extractor 110 such that the airflow assists in minimizing and/or preventing inadvertent opening of the inner extractor 110.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for preventing fluid ingress to a vehicle cabin comprising:
   a housing including an inner one-way valve opening to the cabin, an outer one-way valve opening to a vehicle exterior and located proximate the inner one-way valve defining a chamber there between, an inlet port and an air baffle proximal the inlet port: and
   an air pump in fluid communication with a chamber, the air pump activated by a controller to supply airflow to the chamber via the inlet port in response to sensing a predetermined condition,
   wherein airflow from the inlet port flows in a first direction and impinges on the air baffle, redirecting the airflow in a second direction orthogonal to the first direction and onto the inner one-way valve to prevent opening of the inner one-way valve.

2. The system of claim 1, wherein the controller activates the air pump in response to the predetermined condition being an accelerator pedal position exceeding a predetermined threshold position.

3. The system of claim 1, wherein the controller activates the air pump in response to the predetermined condition being vehicle acceleration exceeding a predetermined threshold acceleration.

4. The system of claim 1, wherein the controller activates the air pump in response to the predetermined condition being a cabin pressure exceeding a predetermined threshold pressure.

5. A vehicle cabin fluid ingress prevention method comprising:
- responsive to vehicle acceleration exceeding a predetermined value, activating an air pump to supply air to a chamber in fluid communication with the cabin and a vehicle exterior,
- impinging the air off a chamber baffle from a first to a second direction, towards and thereby closing an inner one-way valve, away from an outer one-way valve to obstruct fluid flow into the cabin.

6. A method for preventing fluid ingress to a cabin of a vehicle comprising:
- in response to a pressure level of the cabin exceeding a predetermined value, activating an air pump to supply air to an extractor arrangement in fluid communication with the cabin and an exterior of the vehicle;
- increasing the pressure within the extractor arrangement comprising a chamber formed between an inner one-way valve and an outer one-way valve; and
- directing the air from the air pump through a chamber inlet port, impinging the air on an interiorly mounted air baffle proximal the chamber inlet port, redirecting the air orthogonally onto and thereby closing the inner one way valve, pressurizing the chamber to close the inner one-way valve, obstructing fluid flow into the cabin.

* * * * *